(12) United States Patent
Matteucci et al.

(10) Patent No.: US 6,801,473 B2
(45) Date of Patent: Oct. 5, 2004

(54) METHOD FOR ESTIMATING AND REMOVING ARTIFACT NOISE FROM SEISMIC DATA

(75) Inventors: Gianni Matteucci, Houston, TX (US); Yuan Wang, Foster City, CA (US); Linda J. Zimmerman, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 50 days.

(21) Appl. No.: 10/387,050

(22) Filed: Mar. 12, 2003

(65) Prior Publication Data

US 2003/0176975 A1 Sep. 18, 2003

Related U.S. Application Data

(60) Provisional application No. 60/363,695, filed on Mar. 12, 2002.

(51) Int. Cl.$^7$ ................................................ G01V 1/30
(52) U.S. Cl. ............................ 367/47; 367/21; 367/28; 367/45; 367/73; 702/13; 702/17
(58) Field of Search ............................ 372/21, 28, 45, 372/47, 63, 73; 702/13, 17

(56) References Cited

U.S. PATENT DOCUMENTS

| | | | | |
|---|---|---|---|---|
| 4,740,776 A | * | 4/1988 | Sloane | 341/118 |
| 4,775,852 A | * | 10/1988 | Sloane | 341/118 |
| 2004/0071363 A1 | * | 4/2004 | Kouri et al. | 382/276 |

FOREIGN PATENT DOCUMENTS

JP     12527    * 1/2000

OTHER PUBLICATIONS

Daubechies, I. (1988) "Orthonormal Bases of Compactly Supported Wavelets", Communication on Pure and Applied Mathematics, 41, pp. 909–996.

Daubechies, I. (1992) "Ten Lectures on Wavelets", SIAM, Philadelphia, PA, USA.

Foufoula–Georgiou, E., and Kumar, P. (1994) "Wavelets in Geophysics", Eds., Academic Press, New York City, NY, USA.

Mallat, S. (1988) "Review of Multifrequency Channel Decomposition of Images and Wavelets Models", Technical Report 412, Robotics Report 1278, New York Univ., New York City, NY.

Mallat, S. (1989) "A Theory for Multiresolution Signal Decomposition: The Wavelet Representation", IEEE Trans. Pattern Anal. Mach. Intell., 11, pp. 674–693.

Press, W. H., Teukolsky, S. A., Vetteling, W. T. and Flannery, B.P. (1992) *Numerical Recipes in C. The Art of Scientific Computing*, Second Edition, Cambridge Univ. Press, Cambrides, UK, p. 994.

Rioul, O. and Vetterli, M. (1991) "Wavelets and Signal Processing", IEEE SP Magazine, pp. 14–38.

* cited by examiner

Primary Examiner—Nelson Moskowitz
(74) Attorney, Agent, or Firm—J. Paul Plummer

(57) ABSTRACT

A seismic signal is represented as a combination of a geologic signal and a noise signal. The representation of the seismic signal is decomposed into a linear combination of orthonormal components. One or more components are identified in which the geologic signal and the noise signal are uncorrelated. The noise signal is expanded as a product of an unknown noise amplitude modulation signal and a known noise spatial periodicity signal at the identified components. The expansion is solved for an estimate of the noise amplitude modulation signal at the identified components. The noise signal is estimated by multiplying the estimated noise amplitude modulation signal by the noise spatial periodicity signal. The estimated noise signal can be removed from the seismic signal to generate an estimate of the geologic signal.

13 Claims, 12 Drawing Sheets

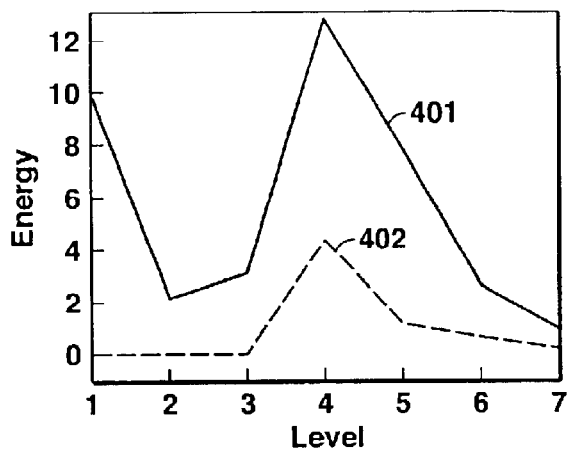
FIG. 4A *(PRIOR ART)*
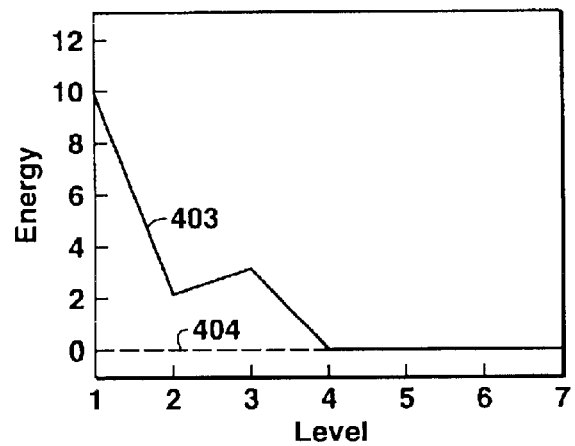
FIG. 4B *(PRIOR ART)*
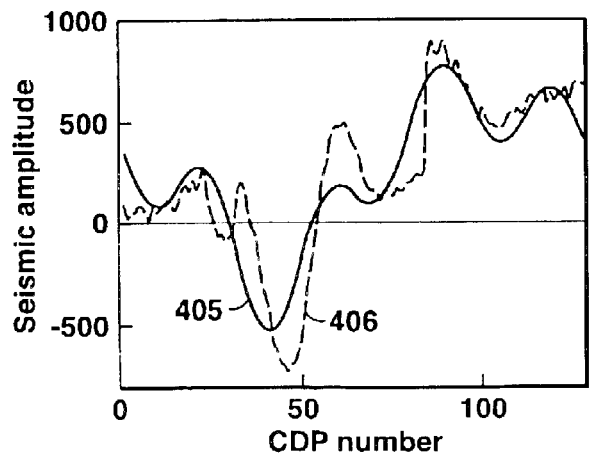
FIG. 4C *(PRIOR ART)*

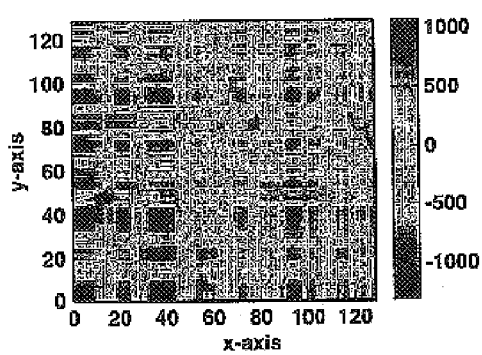 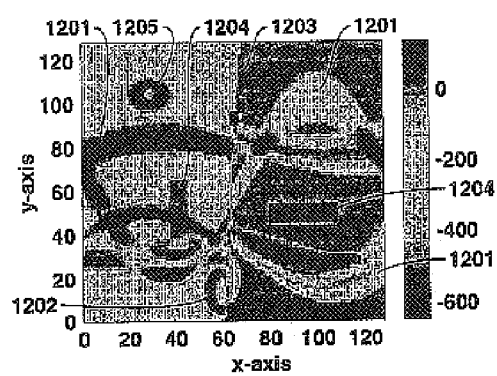
FIG. 12A    FIG. 12B
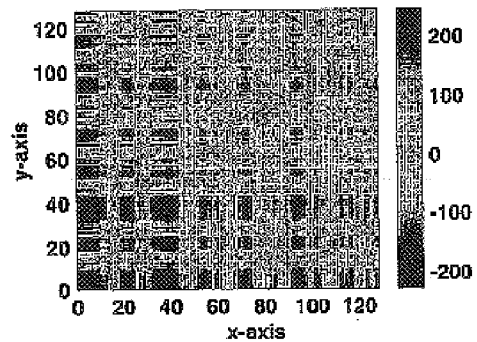 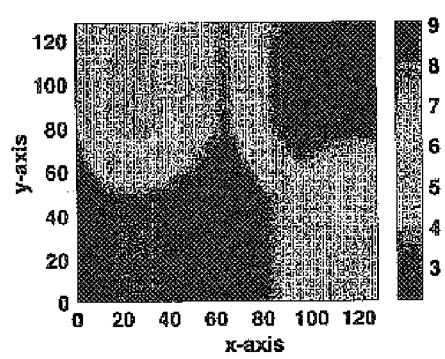
FIG. 12C    FIG. 12D

METHOD FOR ESTIMATING AND REMOVING ARTIFACT NOISE FROM SEISMIC DATA

This application claims the benefit of U.S. Provisional Application No. 60/363,695 filed on Mar. 12, 2002.

BACKGROUND OF THE INVENTION

1. Field of the Invention

This invention relates generally to the field of seismic data processing. Specifically, the invention is a method for the estimation and removal of artifact noise from seismic data.

2. Description of the Related Art

Geophysical prospecting is the activity of searching for deposits of valuable minerals or hydrocarbons, such as oil and gas. Seismic surveys are used in geophysical prospecting to determine the location of potential reservoirs of hydrocarbon deposits in subterranean rock formations. Seismic surveys measure the travel time of seismic waves from the starting locations at seismic sources through reflections off the interfaces between layers in rock formations to the ending locations at seismic receivers. Seismic processing combines the many travel times between source and receiver pairs and attempts to remove all undesired noise in the recorded seismic signal. The desired result is an image of the locations of the rock formations.

At present, seismic data processing techniques result in seismic images that are degraded by noise, or by seismic artifacts. A seismic artifact is any distortion in the seismic data that can impede the ability to accurately estimate reservoir properties of interest from seismic data. An example of a seismic artifact is the interference by a shallower object in the seismic survey of a deeper target. This type of interference, in general, includes the effect of the overburden.

FIG. 1 shows an elevation view illustrating a model of a seismic signal with this type of artifact. The interfering shallow object 101 could be any type of near surface geologic feature, such as shallow gas (shown), gas filled channel complexes, hydrate beds, or salt domes. The interfering shallow object 101 is located between a seismic survey line 102 on the surface and a deeper subsurface target 103, such as a potential hydrocarbon reservoir. The seismic survey line 102 could be located on a surface of the water in a marine seismic survey, or on a surface of the earth in a land seismic survey. The seismic survey line 102 contains the seismic sources 105 and the seismic receivers 106.

These artifacts may arise in several forms. Artifacts can be caused by acquisition parameters, processing parameters, and geologic factors. An acquisition artifact may arise from survey design and execution irregularities and is often spatially periodic or semi-periodic. A geologic artifact may arise from formations above a target horizon having geologic variation or an irregular shape and is often spatially non-periodic. A processing artifact may arise from imperfect processing algorithms and parameter choices, and may be either periodic or non-periodic.

Artifacts with the same spatial periodicity as the acquisition geometry are termed acquisition-related. The spatial periodicity of acquisition-related artifacts can be modeled using conventional modeling techniques. Once the periodicity is identified, that is, the wavenumbers have been determined, several conventional filtering techniques are available to remove (or, more generally, to manipulate) the energy with the same periodicity as the artifacts. However, determining the exact magnitude of the artifacts is beyond current modeling technology. Therefore, removal of the artifacts is often not possible with conventional techniques.

Other types of artifacts are spatially irregular. For example, surface obstacles encountered during data acquisition or geological features of the overburden positioned above a target interval may cause irregularities or shadowing effects in the data. In general, contaminated seismic data can lead to a distorted interpretation of formation properties, which can in turn lead to missed prospects, dry holes, or uneconomic development wells. Thus, it is desirable to be able to remove the effects of these types of artifacts from seismic data. No conventional technique is available for filtering random or pseudo-random artifacts.

The demand for precision in the measurement of formation properties from seismic data is intensifying. Seismic amplitude analysis has long been a key component of successful exploration and exploitation strategies. Increasingly subtle variations in the amplitudes of the seismic data are now being analyzed to achieve detailed areal delineation, estimate pay thickness and net/gross ratio, determine details of the depositional environment, and predict reservoir fluid content, lithology, and migration pathways. However, even within a given seismic data set, acquisition geometry and processing steps can produce significant artifacts and cause variability in seismic amplitudes that are unrelated to the formation properties of interest. The evaluation, quantification, and removal of artifacts are critical to realizing the full potential of quantitative seismic attribute analysis. By developing and applying techniques to remove the artifacts (or perturbations caused by conditions in the overburden) from the seismic data, the accuracy of predictions based on seismic attributes can be improved, and the associated risk in subsequent exploration activity can be lowered.

Currently, artifacts are filtered from seismic amplitude data using two broad approaches: empirical and deterministic. Empirical approaches examine the data in order to identify and manipulate the portion of the signal that appears non-geologic. Such approaches can significantly improve the interpretability of amplitude maps that are contaminated by artifacts such as water bottom multiples. Unfortunately, empirical approaches are susceptible to making merely cosmetic changes to amplitude maps without sufficiently improving the accuracy of the measurements of formation properties. Deterministic artifact mitigation approaches systematically derive corrections based on the causes of the artifacts. These approaches can lead to accurate corrections if all of the true causes of the artifacts are known and correctable. This, however, is rarely the case.

Three empirical methods are commonly used to remove periodic amplitude artifacts from post stack seismic data. These three methods are the moving window average, the discrete wavelet transform low-pass filter, and the fast Fourier transform filter. The latter two filter methods attempt to remove or correct all of the energy at affected periodicities (wavenumbers), but sometimes only deal with a portion of this energy. A comparison of the resolution of these three empirical methods is presented in the following paragraphs after a model of a seismic signal with a periodic amplitude artifact is defined.

The simplest form of a seismic signal with a periodic amplitude artifact is an additive artifact. In one dimension, a signal along a seismic line with an additive artifact can be defined in its most general form by the equation $$f(x) = g(x) + p(x), \quad (1)$$

where
- x is the Common Depth Point (CDP) location,
- f(x) is the recorded seismic signal,
- g(x) is the true geologic signal, and
- p(x) is the noise signal.

FIG. 1 shows an example in which a seismic signal may have an amplitude artifact such as may be characterized by Equation (1). The seismic signal f(x), recorded at receiver 106, consists of the seismic representation of the geologic environment at the target 103 plus the imprint from local artifact 101.

The target or true geologic signal g(x) is the seismic signal that would be recorded if the artifacts created by the acquisition, processing, or geologic imprint were eliminated. It is desired to either solve for or estimate this geologic signal g(x). The perturbation noise signal p(x) represents the artifact noise created by the acquisition, processing, or geologic imprint, and may be either random, semi-periodic, or periodic. The amplitude of perturbation p(x) is unknown, although the overall character of its spatial variation or periodicity is known or may be estimated empirically. Thus p(x) can be written as a product of an unknown amplitude modulation factor and the known or estimated spatial periodicity factor. Doing this, Equation (1) can be rewritten as $$f(x)=g(x)+\epsilon(x)*n(x), \quad (2)$$

where
- $\epsilon(x)$ is the amplitude modulation factor of the noise signal, and
- n(x) is the spatial periodicity factor of the noise signal.

The signal $\epsilon(x)$ represents the unknown amplitude by which the spatial periodicity factor n(x) is added to the true geologic signal g(x). Although referred to as the spatial periodicity factor, it is understood that n(x) may be either periodic or random, and as indicated above, may be known or estimated empirically. If an estimate of $\epsilon(x)$ were available, then the estimated solution of Equation (2) would be given by $$\hat{g}(x)=f(x)-\hat{\epsilon}(x)*n(x). \quad (3)$$

Here the hat or caret symbol (^) denotes estimates of the signals g(x) and $\epsilon(x)$, respectively.

FIGS. 2A–2D show a model of a seismic signal with a periodic amplitude artifact, in each case plotted as amplitude versus CDP number. FIG. 2A is a plot of the amplitude of the recorded seismic signal f(x) 201 versus common depth point (CDP) number. FIG. 2B shows the spatial periodicity signal n(x) 202 of an acquisition artifact and FIG. 2C shows the amplitude modulation signal $\epsilon(x)$ 203 of the artifact. FIG. 2D shows the target or true geologic signal g(x) 204.

The first commonly used method for removing periodic amplitude artifacts is the moving window average. An analysis of the resolution of this method is shown in FIGS. 3A–3C, using the model shown in FIGS. 2A–2D.

FIG. 3A shows a comparison in which signal f(x) 301 from FIG. 2A and the spatial periodicity signal n(x) 302 from FIG. 2B are plotted on the same axis. The horizontal scale (CDP number) in FIGS. 3A–3C has been expanded, as compared to FIGS. 2A–2D, for clarity. FIG. 3B shows a comparison of the estimated geologic signal $\hat{g}(x)$ 303 with the geologic signal g(x) 304 from FIG. 2D. Here, the signal $\hat{g}(x)$ 303 is estimated using a moving window average. FIG. 3C shows a comparison of the averaged noise signal n(x) 305 with the averaged noise product signal $\epsilon(x)*n(x)$ 306. Note that $\hat{\epsilon}(x)*n(x)=f(x)-\hat{g}(x)$, the difference between the original recorded seismic signal and the final estimated geologic signal. The fundamental periodicity of the artifacts determines the proper window size in the moving window average. FIG. 3D shows the loss of resolution, a typical shortcoming of moving window averaging techniques.

The poor fit between the estimated geologic signal $\hat{g}(x)$ 303 and the actual geologic signal g(x) 304 in FIG. 3B is captured by R2 the square of the correlation coefficient between the two signals $R^2=0.659$. A perfect fit of $R=R^2=1$ implies that 100% of the variance in the signal is captured. R and $R^2$ are in non-dimensional units, always varying between −1 and 1 or 0 and 1, respectively.

The poor fit between $\hat{g}(x)$ 303 and g(x) 304 in FIG. 3B is also captured by the Root Mean Square Error, RMSE=228.8, given in the same units as the signal (here, the units of seismic amplitude). The Root Mean Square Error represents the average variability of the difference between the target signal g(x) and the predicted (or filtered) signal $\hat{g}(x)$. A smaller RMSE indicates better results, since it indicates smaller differences. Such statistical measures will be used throughout the comparisons.

The second commonly used method for removing periodic amplitude artifacts is the discrete wavelet transform low-pass filter. The discrete wavelet transform low-pass filter method attempts a straightforward removal of energy at the fundamental frequency of the artifact and that frequency's harmonics. An analysis of the resolution of this method is shown in FIGS. 4A–4C, using the model shown in FIGS. 2A–2D.

FIG. 4A shows the energy distributions of the input signal f(x) 401 and the spatial periodicity signal n(x) 402 before application of the discrete wavelet transform low-pass filter, while FIG. 4B shows the energy distributions of f(x) 403 and n(x) 404 after application of the discrete wavelet transform low-pass filter. FIGS. 4A and 4B are shown as plots of energy versus periodicity levels. As will be understood to those skilled in the art, wavelet analysis signals are decomposed into scales or levels of variability. For example, a signal of 128 points in length might be decomposed into k=7 scales ($2^7=128$) or k+1 levels. These scales, or levels, are analogous to bands of frequency, or wavenumber, in traditional Fourier spectral analysis. The highest scales are associated with the smallest (shortest) trend features. The lowest scales capture the longest trend features. For example, for a signal of 128 points in length, level=8 corresponds to a periodicity of 4 points (twice the Nyquist frequency); level 7 corresponds to an 8-point periodicity, and so on. FIG. 4C shows a comparison of the estimated geologic signal $\hat{g}(x)$ 405 with the actual geologic signal g(x) 406 from FIG. 2D, as a plot of amplitude versus CDP number. Here, the signal $\hat{g}(x)$ 405 is estimated using a discrete wavelet transform low-pass filter.

As with the moving window average method described above, there is a significant loss of resolution with the discrete wavelet transform low-pass filter method. The fit between the estimated geologic signal $\hat{g}(x)$ 405 and the actual geologic signal g(x) 406 in FIG. 4C, as measured by $R^2=0.766$ and RMSE=187.7, is only marginally better than for the moving window average technique as shown in FIG. 3B. In this example all the energy at scales 4 through 7 was removed, as indicated in FIG. 4B.

The third commonly used method for removing periodic amplitude artifacts from seismic data is the fast Fourier transform (FFT) filter. The fast Fourier transform filter method attempts to remove all the energy in the periodicities or wavenumbers affected by the artifacts. An analysis of the resolution of this method is shown in FIGS. 5A–5C, using the model shown in FIGS. 2A–2D.

FIG. 5A shows the wave number distributions of the input signal f(x) 501 and the spatial periodicity signal n(x) 502 before the application of a traditional fast Fourier transform filter, while FIG. 5B shows the wave number distributions of f(x) 503 and n(x) 504 after the application of the fast Fourier transform filter. FIGS. 5A and 5B are shown as plots of logarithm of the amplitude of the signal versus wavenumber. FIG. 5C shows a comparison of the estimated geologic signal $\hat{g}(x)$ 505 with the actual geologic signal g(x) 506 from FIG. 2D, as a plot of amplitude versus CDP number. Here, the signal $\hat{g}(x)$ 505 is estimated using a fast Fourier transform filter.

The energy in the wavenumbers contaminated by the artifact has been reduced, and the loss of resolution is less than in the examples shown in FIGS. 3B and 4C. However, the fit between the estimated geologic signal $\hat{g}(x)$ 505 and the actual geologic signal g(x) 506 in FIG. 5C, as measured by R2=0.668 and RMSE=231.9, is only comparable, if not worse.

For either of the discrete wavelet transform or fast Fourier transform techniques to work, it is essential to have an estimate of the scales or periodicities of the artifacts. If the artifacts are spatially random (e.g., like those produced by geologic variations in the overburden), then any technique based on the discrete wavelet transform or the Fourier transform will give subjective or non-repeatable results as it fails to preserve the main characteristics of the noise.

The examples presented above in FIGS. 3 through 5 are typical of the results obtained by applying the three exemplified methods to one-dimensional signals and provide the context in which the impact of the method of the present invention can be evaluated. The examples show that there is a need for a relatively inexpensive filtering method that is able to identify and then remove the noise due to artifacts from seismic data without introducing bias or aliasing and without loss of resolution. Additionally, this method needs to be applicable to both periodic and non-periodic (random) perturbations.

SUMMARY OF THE INVENTION

The invention is a method for estimating and removing artifact noise from a seismic signal. First, the seismic signal is represented as a combination of a geologic signal and a noise signal. Then the representation of the seismic signal is decomposed into a linear combination of orthonormal components. One or more components are identified in which the geologic signal and the noise signal are uncorrelated. The noise signal is expanded as a product of an unknown noise amplitude modulation signal and a known noise spatial periodicity signal at the identified components. The expansion is solved for an estimate of the noise amplitude modulation signal at the identified components. Finally, the noise signal is estimated by multiplying the estimated noise amplitude modulation signal by the noise spatial periodicity signal. Additionally, the estimated noise signal can be removed from the seismic signal to generate an estimate of the geologic signal.

BRIEF DESCRIPTION OF THE DRAWINGS

The present invention and its advantages may be more easily understood by reference to the following detailed description and the attached drawings in which:

FIG. 4A is a plot of the energy distributions among scales of the seismic signal f(x) and the spatial periodicity signal n(x) before application of the discrete wavelet transform low-pass filter;

FIG. 4B is a plot of the energy distributions among scales of the seismic signal f(x) and the spatial periodicity signal n(x) after application of the discrete wavelet transform low-pass filter;

FIG. 4C is a comparison of the estimated geologic signal $\hat{g}(x)$, estimated using a discrete wavelet transform low-pass filter, with the actual geologic signal g(x) from FIG. 2D;

FIG. 12A is a map view of the recorded seismic signal f(x,y) for a two-dimensional model of an amplitude artifact;

FIG. 12B is a map view of the target geologic signal g(x,y) for the two-dimensional model of an amplitude artifact;

FIG. 12C is a map view of the artifact signal n(x,y) for the two-dimensional model of an amplitude artifact;

FIG. 12D is a map view of the modulation function ε(x,y) applied to the artifact signal in FIG. 12C for the two-dimensional model of an amplitude artifact;

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The invention is a method for removing noise caused by artifacts from seismic data without degrading the spatial resolution of the data. The method of the invention first determines the amplitude of the artifact and then removes it from an input recorded seismic signal. The method of the invention exploits knowledge of the noise signal by filtering out just the portion from the recorded signal in common with the noise. At each location in time or space, the amplitude of the seismic signal is adjusted according to the method of the invention. While this adjustment implies a change in the energy of the signal, it does not affect the resolution of the signal.

Figure 6:
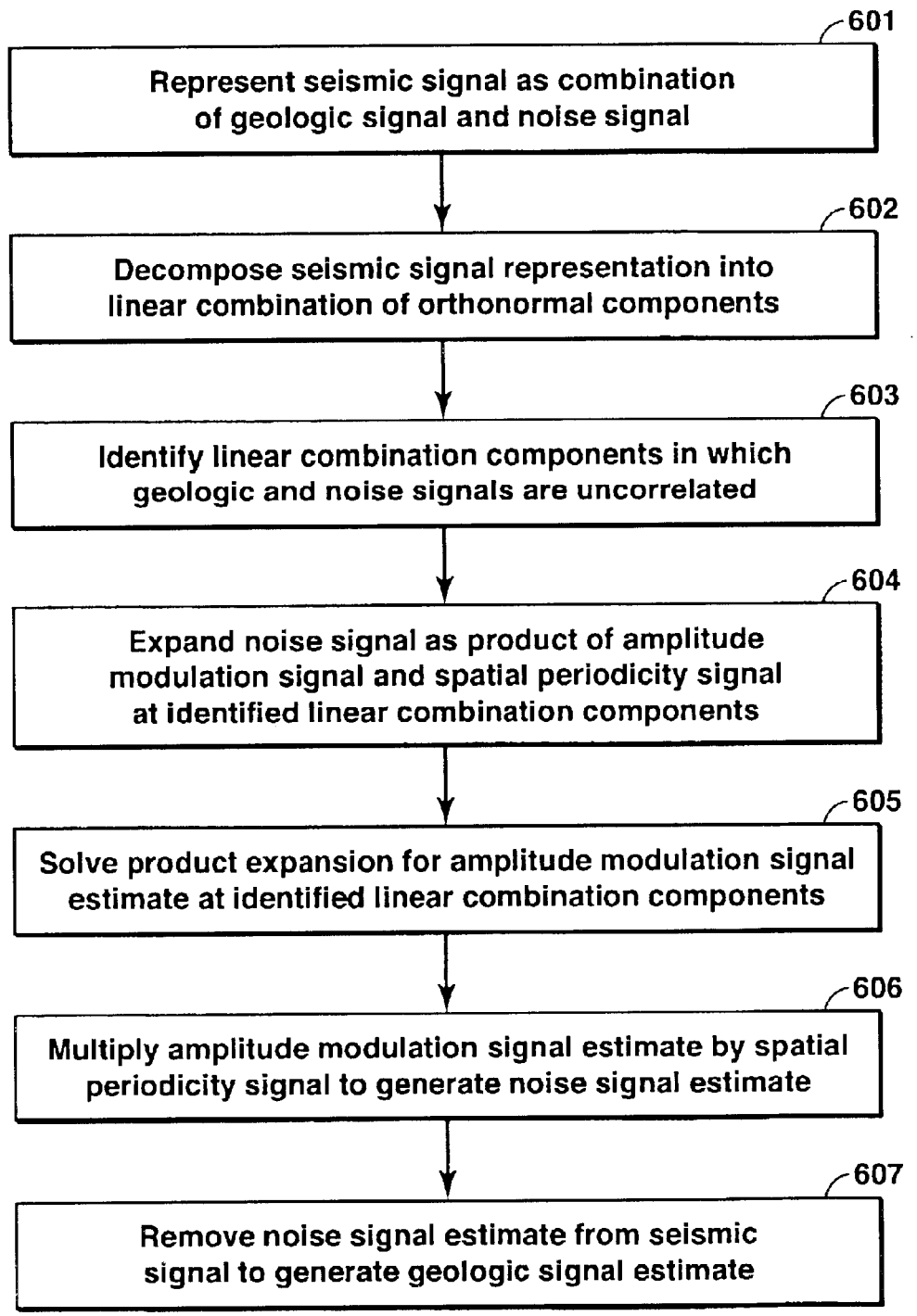
FIG. 6 is a flowchart illustrating the processing steps of an embodiment of the method of the invention for removing noise from a seismic signal.

FIG. 6 is a flowchart illustrating the processing steps of an embodiment of the method of the invention for removing artifact noise from a recorded seismic signal f. The seismic signal f can be one-dimensional, two-dimensional, such as time slices or attribute maps, or three-dimensional volumes. In an alternative embodiment, the seismic signal f can be first split into different portions, such as frequency bands, and the following steps applied to each portion individually. For example, the seismic signal f can be first split into the set of frequency bands given by 5 to 15 Hz, 15 to 25 Hz, and up to 195 to 205 Hz. Then the results from each portion can be added together to yield the final complete solution.

First, at step 601, the recorded seismic signal f is represented as a combination of a geologic signal g and a noise signal p. The geologic signal g is the desired portion of the seismic signal. The noise signal p is treated as a perturbation on the geologic signal g. In a first embodiment, the combination in the representation is a sum. In a second embodiment, the combination is a product. The invention will be illustrated by, but is not limited to, a description in terms of the additive and multiplicative combination embodiments. Other similar embodiments of the combination obvious to those skilled in the art are within the scope of the invention.

The method of the invention works particularly well when the perturbation is additive or multiplicative to the true underlying geologic signal. If the perturbation is known in detail, then the amplitude at which the artifacts occur in the data can be determined. Then such amplitude can be surgically removed. If, conversely, the estimated spatial characteristics of the perturbing signal to be removed from the input signal is a poor guess of the actual perturbation (i.e. estimated perturbation is poorly correlated to the actual perturbation), then the impact of the filtering method of the invention is insignificant. Thus, the filtering method will not introduce any new artifacts in addition to those already present in the data.

Detailed knowledge of the spatial characteristics of the artifact or perturbing signal is a desirable component of the filtering method of the invention. However, the amplitude of the artifact signal can be modulated in an unknown fashion without affecting the performance of the filtering method. Unlike traditional spectral techniques, the method of the invention does not require the subjective selection of the spectral bands most effected by the artifacts. Rather, the method performs an adjustment of the amplitude of the original signal based on knowledge of the spatial character of the artifacts or perturbation. The spatial scales most affected by the artifacts are determined by the data themselves, namely by the presence of strong spurious correlation between the signal and the artifacts.

An embodiment of the method of the invention treating the artifact as an additive combination will be described first, and then the treatment of the multiplicative combination will follow. Starting with the case of one dimension, the additive artifact is defined by Equation (1) above.

The simplest example of an additive artifact as defined by Equation (1) is the situation in which $$f(x)=g(x)+\epsilon_0 * n(x), \tag{4}$$

where the noise signal p is represented by the product of $\epsilon_0$ and n(x). In this example the amplitude modulation signal $\epsilon 0$ is a scalar of unknown value which represents the amplitude of p(x). The spatial periodicity of the noise signal n(x) is still a perturbation known or estimated for all x.

If $\epsilon_0$ can be estimated, then that estimated $\hat{\epsilon}_0$ can be inserted into Equation (2) to yield an estimate of the target geologic signal g(x) by $$\hat{g}(x)=f(x)-\hat{\epsilon}_0{}^*n(x). \quad (5)$$

Solving for the estimate $\hat{\epsilon}_0$ is described in detail in the discussion of step 603 below.

The general case of the additive artifact is defined by Equation (2) above, where $\epsilon(x)$ is assumed to be a spatially non-stationary modulation of the perturbation field. Making $\epsilon(x)$ a spatially varying quantity is a more realistic and general assumption than is inherent to Equation (4). If $\hat{\epsilon}(x)$ can be estimated, then the solution of Equation (2) is given by Equation (3) above. Solving for the estimate $\hat{\epsilon}(x)$ is described in detail in the discussion of step 605 below.

The method of the invention is easily extended to two dimensions, denoted by x and y. The generalized two-dimensional additive artifact case can be written, analogously to Equation (2), as $$f(x,y)=g(x,y)+\epsilon(x,y)^*n(x,y), \quad (6)$$

where f(x,y) is a recorded signal, g(x,y) is the true geologic signal, n(x,y) is a perturbation field, and $\epsilon(x,y)$ is a spatially varying unknown modulation of the perturbation.

The desired geologic signal g(x,y) is now an unknown function of x and y. The perturbation field n(x,y) may be spatially random, periodic, or quasi-periodic. In Eq. (6) and all successive equations with (x,y) dependence, the same locations are identified, for example the same Inline and Crossline or CDP location.

The method of the invention provides an estimate $\hat{\epsilon}(x,y)$, as will be described below in the discussion of step 605. Since f(x,y) and n(x,y) are presumed known and $\hat{\epsilon}(x,y)$ is estimated, a solution to Equation (6) would give the following estimate of the true geologic signal $$\hat{g}(x,y)=f(x,y)-\hat{\epsilon}(x,y)^*n(x,y). \quad (7)$$

Turning now to the case of an artifact expressed by a multiplicative combination, the most general two-dimensional multiplicative case can be written as $$f(x,y)=g(x,y)^*n_1(x,y)+\epsilon_2(x,y)^*n_2(x,y) \quad (8)$$

or as its variant $$f(x,y)=g(x,y)^*[n_1(x,y)+\epsilon_2(x,y)^*n_2(x,y)]. \quad (9)$$

Here the notation is the same as for Equation (6). Note that $n_2$ (x,y) is not the same function in both (8) and (9). The functions f(x,y) and $n_2$(x,y) are known everywhere, while the functions $n_1$(x,y) and $\epsilon_2$(x,y) are unknown. An estimate $\hat{g}$(x,y) for the geologic signal g(x,y) is desired in terms of known or estimated quantities.

The multiplicative artifact given by Equation (9) can be reduced to a special case of the additive artifact given by Equation (6) by redefinition of $\epsilon_2$(x,y). This redefinition is acceptable since the true form of $\epsilon_2$(x,y) is not known. In either case the result is an estimate of g(x,y) as modulated by $n_1$(x). Thus, using equation (9), $$\hat{g}(x,y)=g(x,y)^*n_1(x,y)=f(x,y)-\hat{\epsilon}_2(x,y)^*n_2(x,y), \quad (10)$$

where $$\hat{\epsilon}_2(x,y)=\epsilon_2(x,y)^*g(x,y).$$

Returning to the flowchart in FIG. 6, at step 602, the representation of the seismic signal f from step 601 is decomposed into a linear combination of orthonormal components. The filtering method of the invention is very general. It may be implemented in embodiments that include, but are not limited to, the use of mathematical wavelets (i.e. in the wavelet domain) and traditional Fourier analysis (i.e. in the Fourier domain). The method of the invention allows recovery of a signal effected by perturbations that are either periodic (e.g. artifacts caused by seismic data acquisition) or non-periodic (including random "white" noise or "red" noise). Traditional Fourier analysis is not applicable to non-periodic perturbations. Furthermore, if the perturbation is inversely correlated with the original signal (e.g. a shallow bright perturbation generating amplitude dimming on a deeper target), the filtering method of the invention increases the amplitude of the output signal.

In a first embodiment, the decomposition is mathematical wavelet decomposition. Here, the orthonormal components of the linear decomposition are preferably periodicity levels in the wavelet domain. In a second embodiment, the decomposition is Fourier spectral decomposition. Here, the orthonormal components are preferably frequency bands in the Fourier domain. The invention will be illustrated by, but is not limited to, a description in terms of the mathematical wavelet and Fourier spectral decomposition embodiments. Other similar embodiments of the decomposition obvious to those skilled in the art are within the scope of the invention.

The embodiment treating mathematical wavelet decomposition will be described here. The embodiment treating Fourier spectral decomposition will be covered below. There are several types of mathematical wavelets, as described in Foufoula-Georgiou, E., and Kumar, P., 1994, "*Wavelets in Geophysics*", Eds., Academic Press, New York City, N.Y., USA, and Rioul , O. and M. Vetterli, 1991, "*Wavelets and signal processing*", IEEE SP Magazine, 14–38. Each has unique mathematical properties, with the focus on the bi-orthogonal type of wavelets. Unlike the often-used Daubechies wavelets, the bi-orthogonal wavelet decomposition of a signal yields a wavelet coefficient distribution that is perfectly symmetric to that obtained in the time-reversed version of the signal. Symmetry is useful for this application because the signals being analyzed are spatial rather than temporal and thus have no preferred direction.

Wavelet analysis is performed by applying the discrete wavelet transform to a signal with the selected wavelet type. For analysis here, one of the most common algorithms in discrete wavelet transform analysis is used. This is the Mallat algorithm, as described in Mallat, S., 1988, "*Review of Multifrequency Channel Decomposition of Images and Wavelets Models*", Technical Report 412, Robotics Report 1278, New York University, New York City, N.Y., USA, and Mallat, S., 1989, "*A Theory for Multiresolution Signal Decomposition: The Wavelet Representation*", IEEE Trans. Pattern Anal. Mach. Intell., 11, 674–693. The Mallat algorithm leads to regular tiling, in other words distribution, of the high-frequency representation of the discrete wavelet transform. Generally, wavelet decomposition requires the signal to be of power of 2 samples in length (e.g. 64, 128, or 256 samples). Such limitation can be overcome easily by padding the signal up to a suitable length. Any such padding facilitates the wavelet analysis decomposition of the signal into scales or levels of variability, as described above.

Each signal can also be reconstructed using only a few levels. A signal is said to be reconstructed at level k when only the information available at that level, namely the wavelet coefficients for that level, is used. For example, for a reconstruction at k=8, the reconstructed signal would contain essentially only the highest frequency components (smallest scales). An embodiment addressing Fourier spectral decomposition will be described below.

Returning to the flowchart in FIG. 6, at step 603, one or more of the decomposed components in the linear combination from step 602 are identified which contain the dominant information portion of the noise signal p. This identification is made by determining which components are those in which the geologic signal g and the noise signal p are uncorrelated. Depending upon the application, the user of the present invention will find that the geologic signal and the noise signal may be considered uncorrelated for some, most or all of the orthonormal components. These components are statistically independent. In the following, two signals that are statistically uncorrelated will be referred to as independent or orthogonal.

The assumption of orthogonality at some scale between the geologic signal g and the perturbation noise signal p implies their independence. The filtering method of the invention removes from the geologic signal g the contribution by the artifact noise signal n that is correlated to the seismic signal f at some scale (or frequency band). This is equivalent to restoring the amplitude of the true geologic signal g as if the perturbation artifact never existed.

Wavelet decomposition is an orthonormal process. The information captured at different levels is independent. Wavelet decomposition is also a linear process. The full signal can be recovered by summing the contributions of all the levels over which it has been decomposed. An input seismic signal f(x) can be written as uniquely separable into its level-dependent reconstructions. Mathematically, $$f(x) = \sum_{k=1}^{k_{max}} f_k(x), \quad (11)$$

where k is the level number, $k_{max}$ is the maximum level, $f_k(x)$ is the reconstructed signal at the kth level, and $$f_k(x) \cdot f_j(x) = \delta_{kj}. \quad (12)$$

Here, the dot represents the scalar product and $\delta_{kj}$ is the Kronecker delta function. Equation (12), apart from a scalar factor, can be interpreted statistically as a correlation coefficient. This means that individual signal decompositions are uncorrelated. Equation (12) implies the orthonormality of the different levels.

The above procedures can be applied to the simplest one-dimensional additive version, given by Equation (4). At the highest level, for example, $k=k_{max}=8$ for 128 points, $$f_8(x) = g_8(x) + \epsilon_0 * n_8(x). \quad (13)$$

Computing the scalar product with $n_8(x)$ yields $$f_8(x) \cdot n_8(x) = g_8(x) \cdot n_8(x) + \epsilon_0 * n_8(x) \cdot n_8(x). \quad (14)$$

In this simple case the solution to Equation (4) follows directly. If it is assumed that $$g_8(x) \cdot n_8(x) = 0, \quad (15)$$

that is, that the two vectors are uncorrelated or orthogonal to each other, then it follows from Equation (14) that $$\epsilon_0 = \frac{f_8(x) \cdot n_8(x)}{n_8(x) \cdot n_8(x)}. \quad (16)$$

Since the scalar product $n_8(x) \cdot n_8(x) = 1$ and f(x) and n(x) are known, then $\epsilon_0$ can be computed directly from Equation (16) for this simple case of a scalar amplitude modulation signal $\epsilon_0$.

The technique of this embodiment of the invention thus provides the solution for $\epsilon_0$, the amplitude by which the perturbation field is added to the true geological signal. Hence, the estimated solution from the filtering method of the invention is given by Equation (5) above. The implication of a constant $\epsilon_0$ is the assumption that the artifact contribution is both additive and spatially stationary.

The assumption behind Equation (15) is that at some level (for example, at the highest frequency), the geologic signal is uncorrelated to the high-frequency component of the perturbation caused by the artifact. This is a reasonable assumption since seismic surveys are usually designed to achieve a certain spatial resolution capable of imaging the smallest economically valid geologic features (e.g. channels). The noise may thus be confined to the smallest scales while the true geological signal may exhibit a dominant scale that is greater than the seismic grid spacing. The assumption also appears reasonable since the artifact perturbation may occur with a dominant scale. It then follows that the amplitude of the recorded seismic signal, f(x), is dominated by the artifact perturbation p(x) and that the amplitude of the true geological signal, g(x), is independent from the perturbation strength. The identification of such a dominant scale (or scales) thus becomes an important step in the filtering method of the invention. In geological terms, the estimate of the artifacts may derive from a shallow interval in the overburden having a depositional history and spatial patterns completely different from those inferred at a target reservoir level. The occurrence of significant correlation between the deeper and the shallower signals, f(x,y) and n(x,y), respectively, should then be assumed to be purely spurious and not geological.

Returning to the flowchart in FIG. 6, at step 604, the noise signal p from step 601 is expanded as a product of an unknown noise amplitude modulation signal $\epsilon$ and a known noise spatial periodicity signal n at the linear combination components identified in step 603. Preferably, the noise amplitude modulation signal $\epsilon$ is expanded in a series of orthonormal basis functions.

In Equation (2), the generalization of the one-dimensional additive artifact problem, the assumption of a spatially stationary perturbation is relaxed. Now $\epsilon(x)$ is assumed to be variable spatially. Assumptions about the functional form of $\epsilon(x)$ are also made. Specifically, $\epsilon(x)$ is decomposed into a set of continuous orthonormal functions (or polynomials). Mathematically, the only necessary assumption is that the decomposition is of the doubly continuous type. Possible decompositions include, but are not limited to, a polynomial expansion, Legendre polynomials, Chebychev polynomials, or a mathematical wavelet decomposition, each with its own boundary conditions. Whatever particular decomposition is used, the coefficients of the expansion are unknown. The method of this embodiment of the invention will determine the values of these coefficients.

For example, using Legendre polynomials $p_j(x)$, $$\varepsilon(x) = \sum_{j=0}^{M} \varepsilon_j p_j(x). \tag{17}$$

The Legendre polynomials $p_j(x)$, for $j=0, \ldots, M$, constitute an orthonormal basis over the domain given by $x \in [-1,1]$. The periodicity of these smoothly varying functions increases as the order of the polynomial. To perform the decomposition successfully, the signals, $f(x)$, $g(x)$ and $n(x)$, are always mapped onto the $[-1,1]$ domain.

Explicitly, using equation (2) and (17)

$$f(x) = g(x) + \left(\sum_{j=0}^{M} \varepsilon_j p_j(x)\right) * n(x). \tag{18}$$

Once again Equation (18) is decomposed into the wavelet levels using the Mallat algorithm and a specific wavelet type (level k=8), $$f_8(x) = g_8(x) + \left[\left(\sum_{j=0}^{M} \varepsilon_j p_j(x)\right) * n(x)\right]_8, \tag{19}$$

where the bracket means that the whole functional product is evaluated at the chosen (kth=8th) level.

Returning to the flowchart in FIG. 6, at step 605, the product expansion from step 604 is solved for an estimate of the noise amplitude modulation signal $\hat{\varepsilon}$ at the linear combination components identified in step 603. The application of a solution procedure similar to that used in the simple case discussed in Equations (13)–(16) leads to an undetermined problem, because in the general case there are several unknown coefficients $\varepsilon_j$. To solve Equation (18), the scalar product of Equation (19) with the term $[p_k(x)*n(x)]_8$ is computed. The following system of M+1 equations is obtained, $$[p_k(x)*n(x)]_8 \cdot f_8(x) = \tag{20}$$
$$[p_k(x)*n(x)]_8 \cdot g_8(x) + [p_k(x)*n(x)]_8 \cdot \left(\sum_{j=0}^{M} \varepsilon_j [p_j(x)*n(x)]_8\right)$$

for each k, where the range of k is 0 to M. It is still assumed that at a certain level the artifact and the signal are uncorrelated (orthogonal) to each other. Thus, it is assumed that $$[p_k(x)*n(x)]_8 \cdot g_8(x) = 0. \tag{21}$$

Physically speaking, this assumption means that at certain scales the only type of variability is due to the recording or transmission noise. The true geologic signal is assumed to occur at other scales. The scalar products yield coefficients $$[p_j(x)*n(x)]_8 \cdot [p_k(x)*n(x)]_8 = n_{jk} \tag{22}$$

thus reducing Equation (20) to a M-dimensional linear system $$[p_k(x)*n(x)]_8 \cdot f_8(8) = \sum_{j=0}^{M} \varepsilon_j n_{jk} \tag{23}$$

The left-hand side of Equation (23) is known and so are the coefficients $n_{jk}$. Standard numeric algorithms (matrix inversion) are used to solve Equation (23) for the unknown values for $\varepsilon_j$. The final solution is given by inserting these values for $\varepsilon_j$ into Equation (2) to give Equation (5). This yields $\hat{g}(x)$ as the estimate of the true geologic signal $g(x)$.

Now the issue is addressed of how large is the order M of the polynomial expansion. First, $\varepsilon(x)$ must be a slowly varying function of x. In this formulation $\varepsilon(x)$ represents spatially non-stationary conditions. Therefore, $\varepsilon(x)$ contains larger (longer) trends than the actual perturbation, $n(x)$. The function $\varepsilon(x)$ is called the low-frequency modulation of the perturbation/noise field. It is preferred that M be such that the typical scales associated with $p_M(x)$ (namely its highest scale) is much larger than the smallest scale of $n(x)$, that is, $$p[(p_M(x)] >> p[n(x)], \tag{24}$$

where p[f] represents the periodicity of, or typical scales associated with, a function f. As the order M increases, the shorter becomes the associated periodicity (the smaller becomes the most typical scale). For example, for a reference signal composed of 128 discrete points with significant power having a 4-point periodicity, the order M=8 (period= 16 points) is sufficient. Equation (23) then reduces to a system of 8 linear equations.

Returning to the flowchart in FIG. 6, at step 606, the noise modulation amplitude signal $\hat{\varepsilon}$ estimated in step 605 is multiplied by the noise spatial periodicity signal n from step 604 to generate an estimate of the noise signal $\hat{p}$. Finally, at step 607, the noise signal $\hat{p}$ estimated in step 606 is removed from the original recorded seismic signal f to generate an estimate of the geologic signal $\hat{g}$.

The solution found to the one-dimensional additive artifact problem described in Equation (2) in the wavelet domain can be extended to the Fourier domain. This is possible because the Mallat algorithm for performing the discrete wavelet transform can be easily translated into the format of the time-frequency representation of a signal. For example, the information contained in the 8th-level discrete wavelet transform is also contained in the Fourier band extending from wavenumber 32 to 64 (that is, up to the Nyquist frequency). This band is called the high-frequency band$_{(HFB)}$. Hence Equation (19) can be replaced by $$f_{HFB}(x) = g_{HFB}(x) + \left[\left(\sum_{j=0}^{M} \varepsilon_j p_j(x)\right) * n(x)\right]_{HFB}. \tag{25}$$

Then the problem is solved by assuming again that for each $k=0, \ldots, M$, $$g_{HFB}(x) \cdot [p_k(x)*n(x)]_{HFB} = 0. \tag{26}$$

Notice that here $f_{HFB}(x)$ represents the portion of the $f(x)$ signal that contains only high frequencies. In practice, a fast Fourier transform is performed on f(x), its wavenumbers are analyzed, only certain wavenumbers are retained, then an inverse fast Fourier transform is performed to get what was denoted as $f_{HFB}(x)$.

The solution to the one-dimensional case discussed above using both the discrete wavelet transform and the fast Fourier transform has been directed to the case where the dominant scales of the perturbation/artifacts were limited to the highest wavelet scales or the equivalent highest frequency band. The technique of the invention is not limited to such scales. Any wavelet band or collection of bands (any frequency band or collections of bands) may contain the dominant energy of the perturbation/artifacts. The characteristics of the artifact signal n(x) or n(x,y) will determine ultimately which bands are most appropriate.

The solution method for the two-dimensional case is a straightforward extension for both the wavelet domain and the Fourier domain of the solution for the one-dimensional version. Assuming that the sizes of the images/maps are the same for the x and y directions, any signal can be decomposed into an equal number of wavelet levels or wavenumbers. If, for example, $M_x = M_y = 128$, then 8 is the maximum number of levels for both x and y for the two-dimensional Mallat discrete wavelet transform decomposition. The two-dimensional discrete wavelet transform analysis of energy (or entropy) at all the available levels thus can be summarized into an 8 by 8 matrix representation.

At some level, for example at the highest level in both x and y, the decomposition of Equation (6) yields, $$f_{88}(x,y) = g_{88}(x,y) + [\epsilon(x,y) * n(x,y)]_{88}. \quad (27)$$

Assume again that $\epsilon(x,y)$ is a slowly varying function in x and y. The generalization of Equation (17) in two dimensions can be written as $$\epsilon(x,y) = \sum_{i,j=0}^{M_x, M_y} \epsilon_{ij} p_i(x) p_j(y), \quad (28)$$

where $p_i(x)$ is the ith Legendre polynomial in x, $p_j(y)$ is the jth Legendre polynomial in y, and $\epsilon_{ij}$ are the corresponding unknown coefficients. As discussed above, the polynomial expansion used here for simplicity can be replaced by a similar decomposition using other sets of functions, including wavelets.

Inserting Equation (28) into Equation (27) yields the two-dimensional version of Equation (18) as $$f_{88}(x,y) = g_{88}(x,y) + \left[ \left( \sum_{i,j=0}^{M_x, M_y} \epsilon_{ij} p_i(x) p_j(y) \right) * n(x,y) \right]_{88}. \quad (29)$$

The solution of Equation (29) involves the computation of its scalar product with the term $$[p_\alpha(x) p_\beta(y) n(x,y)]_{88}, \quad (30)$$

where $\alpha=0$ to $M_x$ and $\beta=0$ to $M_y$. This yields, similar to Equation (20), $$[p_\alpha(x) p_\beta(y) n(x,y)]_{88} \cdot f_{88}(x,y) = [p_\alpha(x) p_\beta(y) n(x,y)]_{88} \cdot g_{88}(x,y) + \quad (31)$$
$$\sum_{i,j=0}^{M_x, M_y} \epsilon_{ij} [p_i(x) p_j(y) n(x,y)]_{88} \cdot [p_\alpha(x) p_\beta(y) n(x,y)]_{88}.$$

Assuming that, for all $\alpha$ and $\beta$, $$[p_\alpha(x) p_\beta(y) n(x,y)]_{88} \cdot g_{88}(x,y) = 0 \quad (32)$$

yields a system of $(M_x+1)$ by $(M_y+1)$ linear equations, $$[p_\alpha(x) p_\beta(y) n(x,y)]_{88} \cdot f_{88}(x,y) = \sum_{i,j=0}^{M_x, M_y} \epsilon_{ij} n_{ij\alpha\beta}. \quad (33)$$

Here, the following notational substitution has been made in Equation (33), $$i \; n_{ij\alpha\beta} = [p_i(x) p_j(y) n(x,y)]_{88} \cdot [p_\alpha(x) p_\beta(y) n(x,y)]_{88}. \quad (34)$$

From the knowledge of $\epsilon_{ij}$, the true geologic signal g(x,y) can be estimated as $$g^{\wedge}(x,y) = f(x,y) - \sum_{i,j=0}^{M_x, M_y} \hat{\epsilon}_{ij} p_i(x) p_j(y) n(x,y). \quad (35)$$

Once again $M_x$ and $M_y$ are chosen according to the variability of the artifacts n(x,y). Generally, higher values of $M_x$ and $M_y$ increase the complexity of the system. As typical of linear equations, the increase in dimensions of the system leads to numerical instability and a drop in numerical algorithm performance. The extension of the solution of Equation (6) in the two-dimensional Fourier domain is again a straightforward extension of Equations (27)–(35) using the standard Fourier spectral terminology.

Ultimately, the most appropriate choices for the functional representation of the artifacts, the highest orders in x and y for such representation, and the scales at which the geologic signal is assumed to be uncorrelated (independent) to the artifact noise signal, must be determined from the characteristics of the signals being analyzed. The filtering is an adjustment of the amplitude of the input signal, namely, of its coefficients in the wavelet domain or of its real and imaginary components in the Fourier domain. Thus, it is not merely the removal of energy at the scales or locations affected by the perturbation/artifacts. Indeed, if the recorded seismic signal f(x,y) and the perturbation p(x,y) are anti-correlated, in other words negatively correlated, which, from geological considerations is a reasonable postulation at the dominant scale of the perturbation, then the application of the filtering method of the invention leads to an adjusted increase of the amplitude of the geological signal g(x,y) at the dominant scale The solution procedure summarized above also applies to situations in which the perturbation is extremely localized. Equation (6) is still employed, but in this case, the perturbation field is of arbitrary shape and localized in space. As an example, the input signal may be defined over a 128 by 128 pixel region, but the largest effect due to the perturbation (or the imaging artifact) is confined to a 40 by 40 pixel area. In this case, the straightforward application of the method outlined above may not yield optimal results, as significant edge effects may arise. In addition, since this method relies upon the correlation between the artifact noise signal and the input seismic signal at some scale, the inclusion of a greater number of points when estimating such correlation usually weakens an otherwise significant effect.

Indeed, it is well known in the art that a correlation (namely the linear correlation coefficient R) is always a pure number between −1 and 1. The calculation of R requires that at least two points are available. In such case, R is always either −1 or +1 because R expresses a conventional way to summarize the linear fit to the data. Unfortunately R alone is a poor measure of deciding whether an observed correlation is statistically significant. The measure of R should always be complemented with a statement about the number of data pairs over which it is calculated. Intuitively it should be obvious that a correlation of say R=0.8 ought to be statistically more significant if obtained over 1000 data pairs rather than 10 data pairs. The chances of measuring a spuriously good fit by accident should be very low in the former rather than in the latter case. A conventional way to quantify such intuition is to calculate the (statistical) significance of the correlation. Such a significance estimate factors out the number of data pairs over which R is calculated and thus allows the meaningful comparison of the strength of any two relationships which have been estimated with different numbers of data points. This is described in Press, W. H., S. A. Teukolsky, W. T. Vetteling, and B. P. Flannery, 1992, *Numerical Recipes in C: The Art of Scientific Computing*, Second Edition, Cambridge University Press, Cambridge, United Kingdom, 994 pp. The best solution is found by selecting the region where the effect of the artifact perturbation on the input signal is strongest. This is done interactively by applying a variant to the process described above.

Assume that the largest perturbation is confined to a subset M(x,y) of the general perturbation n(x,y). Such area is identified interactively by selecting it and correlating it with the same spatial subset of the input signal f(x,y). A smooth mask function $M_s(x,y)$ is created from M(x,y) and a new perturbation field $$n_2(x,y)=M_s(x,y)*n'(x,y), \quad (36)$$

is created, where n'(x,y) is the original perturbation without its mean (DC component). The new perturbation field $n_2(x, y)$ is decomposed in scales or frequency bands and the steps outlined earlier for the general case are then applied.

An alternative embodiment of the method of the invention in three dimensions involves the generation of a seismic data volume with the artifact noise mitigated. From the steps presented above, Equation (7) can be divided by f(x,y,z) and rewritten in three dimensions as $$asf(x, y, z) \equiv \frac{g^{\wedge}(x, y, z)}{f(x, y, z)} = 1 - \frac{\varepsilon^{\wedge}(x, y, z)*n(x, y, z)}{f(x, y, z)}, \quad (37)$$

where asf(x,y,z) is a locally-varying amplitude scaling factor. If the noise n(x,y,z) is estimated from a shallow interval containing the source of perturbations which affect a deeper reservoir interval from which f(x,y,z) is extracted, then the scaling factor asf(x,y,z) can be applied to the deeper interval to obtain a mitigated seismic mini-volume. In essence, the basic steps of the technique described above can be implemented in a volumetric approach by recognizing that in general application any of the variables in Equations (7) and (37) are a function of depth, typically given by two-way seismic travel time. For example, f(x,y,z) may be a seismic attribute map extracted from a certain interval, while n(x,y,z) may be the noise estimate originating from a shallower interval. As a nonrestrictive example, the seismic attributes could be extracted from an interval as root-mean-square averages. The amplitude scaling factor asf(x,y,z) would apply specifically to the interval used for the extraction of f(x,y,z). However, it is entirely possible that a secondary structure of interest may exist at an even deeper interval, thus requiring the entire seismic data volume to be noise-mitigated. This may easily be accomplished by iterating the method through the specification of multiple vertical intervals or extraction windows.

More specifically, if the analysis interest is concentrated at the level of a first reservoir, Reservoir 1, then the method may be applied to such level by removing any disruption originating in the overburden. However, it is likely that the effects of the overburden may also extend further down to a second, Reservoir 2, level. Thus, an amplitude-scaling factor for the corresponding window may be desired. The extraction windows may be specified by time slices or interpreted horizons. Thus, in a first example, the extraction windows could comprise the half-second time intervals from 0.5 to 1 seconds, from 1 to 1.5 seconds, and so forth, down as far down as the signal extends. As a second example, the extraction windows could comprise the intervals between the succeeding interpreted horizons. The optimal choice of the thickness of the windows, their number, and the degree of overlapping (if any) are to be determined on a case-by-case basis since they are ultimately dependent on local geological conditions.

Ultimately, for each x and y location a vertically-varying amplitude scaling factor asf(x,y,z) will be calculated that when multiplied by the original seismic volume will yield a noise-mitigated seismic volume. In such a final implementation, the artifact noise removal method of the invention is truly a post-stack seismic processing flow.

1. EXAMPLES

The results of several tests of the method of the invention are presented below using a synthetic example and actual data. Generally, the results are illustrative of the successful application of the method of the invention to strongly localized, non-periodic arbitrary perturbations without incurring the limitations of a discrete wavelet transform or fast Fourier transform expansion. These would be usually constrained to record lengths equal to a power of two, so zero padding to the next power of two is often required.

The filtering method of the invention is applied to the one-dimensional problem discussed with the model shown in FIGS. 2A–2D, using both the discrete wavelet transform and the fast Fourier transform embodiments. The results will be compared to what was obtained using current technology, as shown in FIGS. 3A through 5C, discussed above.

Figure 1:
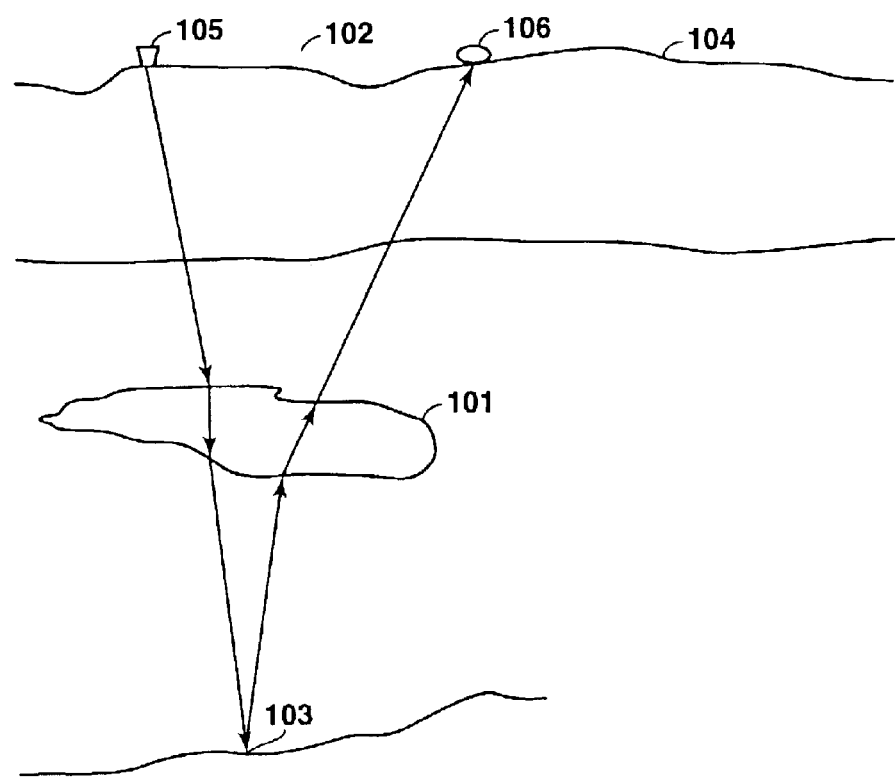
FIG. 1 is an elevation view illustrating a model of a seismic structure with a subsurface which may cause an amplitude artifact in a recorded seismic signal.
Figure 2A:
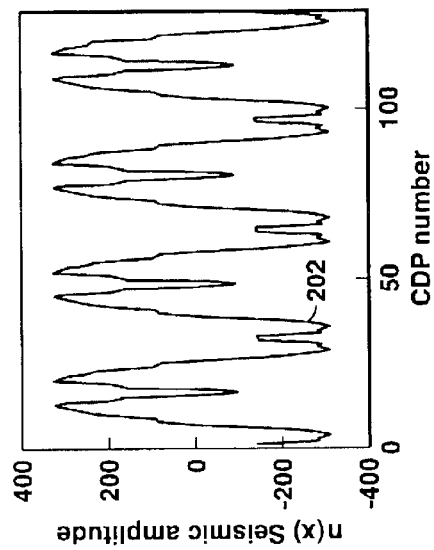
FIG. 2A is a plot of the amplitude of a seismic signal f(x) versus CDP number for a model having a periodic amplitude artifact.
Figure 2B:
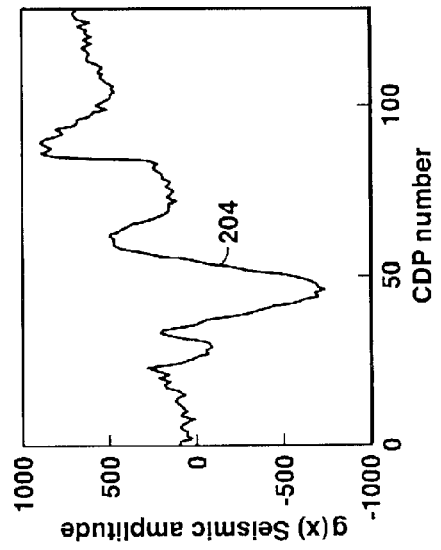
FIG. 2B is a plot of the amplitude of the spatial periodicity signal n(x) versus CDP number for the model having a periodic amplitude artifact.
Figure 2C:
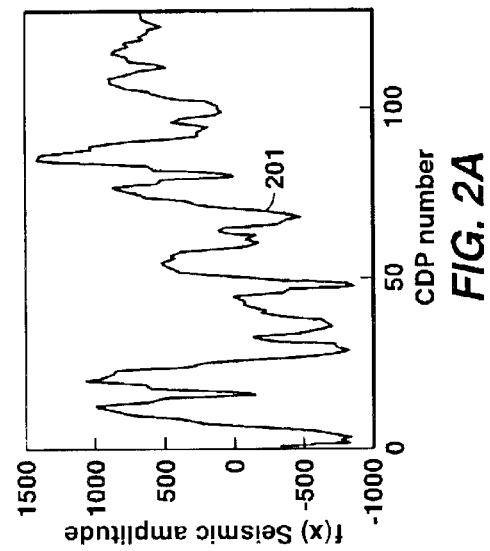
FIG. 2C is a plot of the amplitude of the amplitude modulation signal ϵ(x) versus CDP number for the model having a periodic amplitude artifact.
Figure 2D:
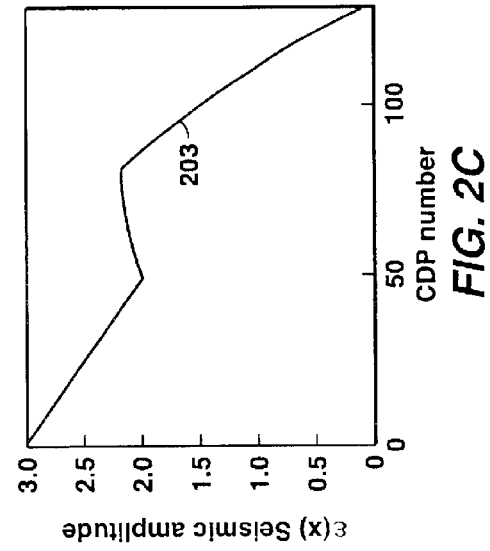
FIG. 2D is a plot of the amplitude of the target seismic signal g(x) versus CDP number for the model having a periodic amplitude artifact.
Figure 3A:
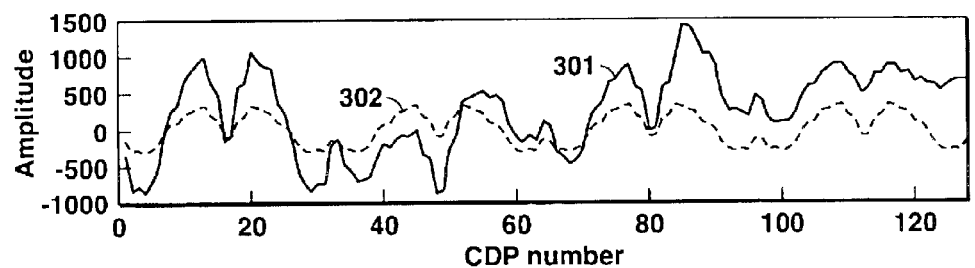
FIG. 3A is a comparison of the seismic signal f(x) from FIG. 2A with the spatial periodicity signal n(x) from FIG. 2B.
Figure 3B:
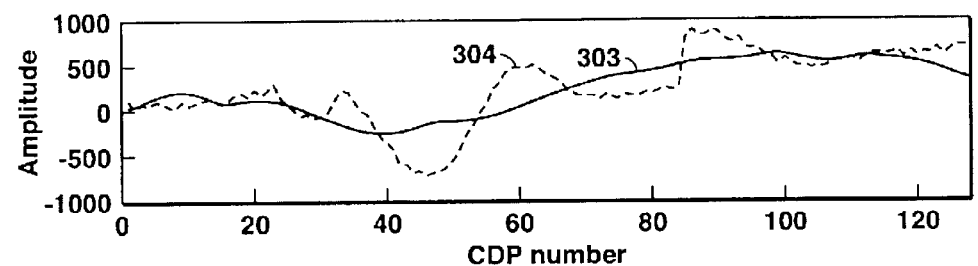
FIG. 3B is a comparison of the estimated geologic signal $\hat{g}(x)$, estimated using a moving window average, with the target geologic signal g(x) from FIG. 2D.
Figure 3C:
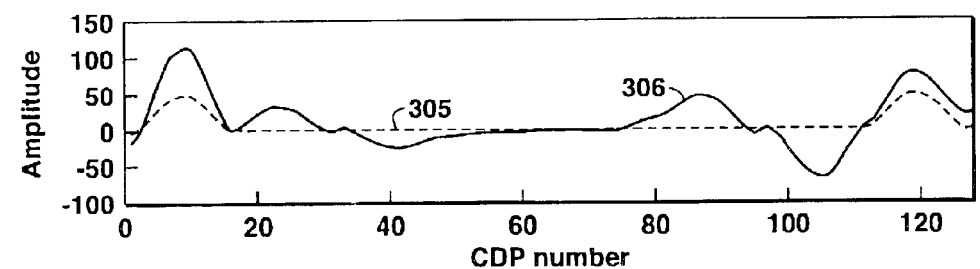
FIG. 3C is a comparison of the averaged spatial periodicity signal n(x) with the averaged noise signal ϵ(x)*n(x)
Figure 5A:
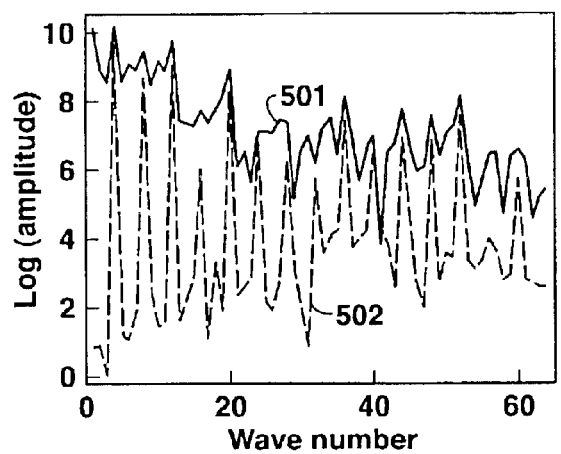
FIG. 5A is a plot of the log of the amplitude of the seismic signal f(x) and the spatial periodicity signal n(x) versus wavenumber, before application of the fast Fourier transform filter.
Figure 5B:
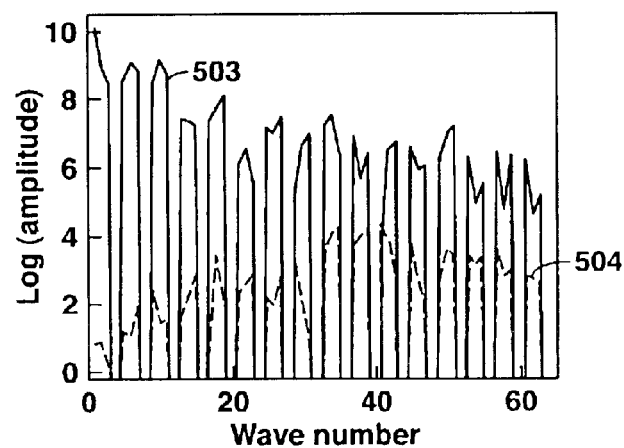
FIG. 5B is a plot of the log of the amplitude of the seismic signal f(x) and the spatial periodicity signal n(x) versus wavenumber, after application of the fast Fourier transform filter.
Figure 5C:
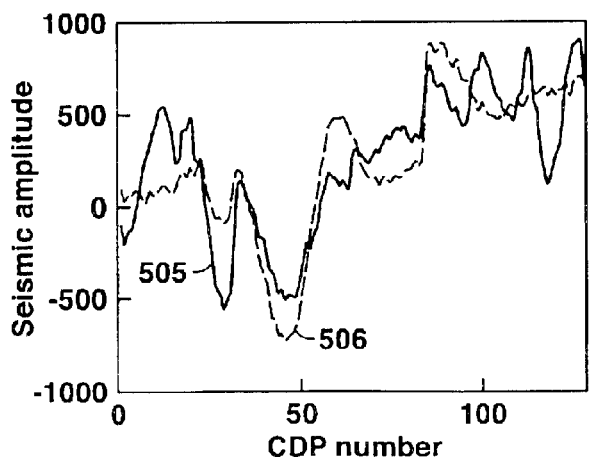
FIG. 5C is a comparison of the estimated geologic signal $\hat{g}(x)$, estimated using a fast Fourier transform filter, with the actual geologic signal g(x) from FIG. 2D, plotted versus CDP number.
Figure 7A:
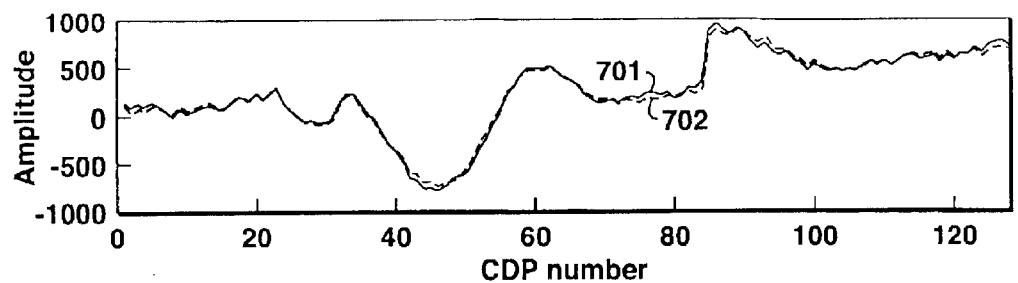
FIG. 7A is a comparison of the estimated geologic signal $\hat{g}(x)$, estimated using an embodiment of the invention implemented in the discrete wavelet transform domain, with the target signal g(x) from FIG. 2D.
Figure 7B:
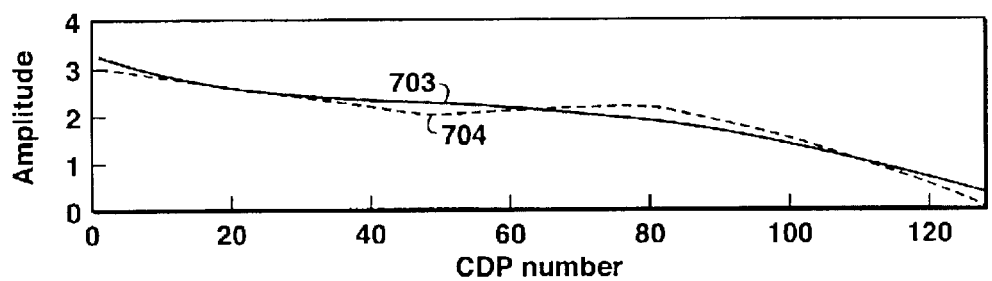
FIG. 7B is a comparison of the estimated modulation of the noise signal $\hat{\epsilon}(x)$ with the actual modulation ϵ(x) from FIG. 2C.

Recall that FIG. 3A shows a comparison of the input signal f(x) 301 from FIG. 2A with the artifact signal n(x) 302 from FIG. 2B. FIG. 7A shows a comparison of the estimated geologic signal ĝ(x) 701 with the actual target signal g(x) 702 from FIG. 2D, plotted as amplitude versus CDP number and with the horizontal scale expanded as compared to FIG. 2D. Here, the signal ĝ(x) 701 is estimated using the method of the embodiment of the invention implemented in the discrete wavelet transform domain. FIG. 7B shows a comparison of the estimated amplitude modulation portion of the noise signal ê(x) 703 with the actual modulation ε(x) 704 from FIG. 2C, also plotted as amplitude versus CDP number.

The fit in FIG. 7A is excellent, with $R^2=0.994$. Almost 100% of the total variability is captured by the filtered signal. The RMSE is only 32 amplitude units over a total range of approximately 1700 units; essentially the model error is on average less than 2% of the amplitude range. The sharpness of the changes is retained with no apparent loss in resolution.

The fit for the amplitude modulation ε(x) 704 in FIG. 7B is also good, though not quite as good as the fit of the filtered signal. This is generally true for a wide class of conditions in which such modulation is mathematically discontinuous.

Figure 8A:
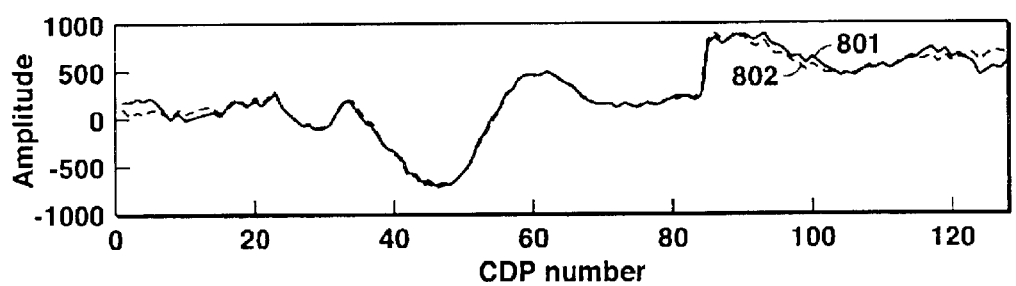
FIG. 8A is a comparison of the estimated geologic signal $\hat{g}(x)$, estimated using an embodiment of the invention implemented in the fast Fourier transform domain, with the target geologic signal g(x) from FIG. 2D.

FIG. 8A shows a comparison of the estimated geologic signal ĝ(x) 801 with the actual geologic signal g(x) 802 from FIG. 2D, although the horizontal scale in FIG. 8A is expanded in comparison to FIG. 2D. Here, the signal ĝ(x)

Figure 8B:
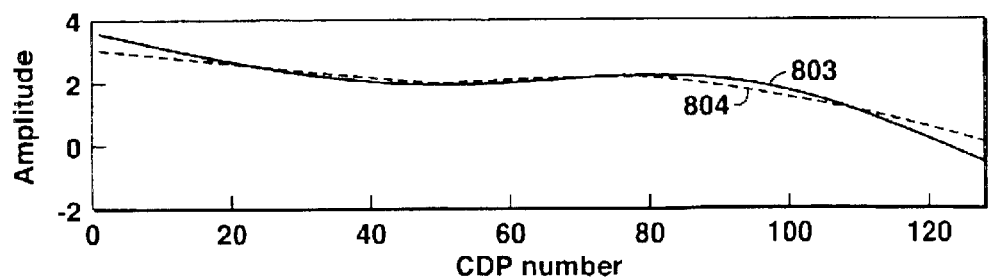
FIG. 8B is a comparison of the estimated modulation of the noise signal $\hat{\epsilon}(x)$ with the actual modulation ϵ(x) from FIG. 2C.

801 is estimated using an embodiment of the method of the invention as implemented in the fast Fourier transform domain. FIG. 8B shows a comparison of the estimated amplitude modulation portion of the noise signal $\hat{\epsilon}(x)$ 803 with the actual amplitude modulation $\epsilon(x)$ 804 from FIG. 2C, again with the horizontal scale expanded.

Again, the estimated geologic signal in FIG. 8A shows a close fit, with $R^2=0.981$ and RMSE=53.0. Spatial resolution is well maintained. These results match the wavelet domain embodiment of the present invention and are substantially better than the traditional techniques shown in FIGS. 3A through 5C. Generally speaking, over a wide variety of numerical experiments the filtering with the method of the invention always gives a better fit, whether implemented in the wavelets or Fourier domain embodiments. The only, minor, shortcoming is related to edge effects. Even then, they are much smaller than with the current methods discussed earlier.

Figure 9A:
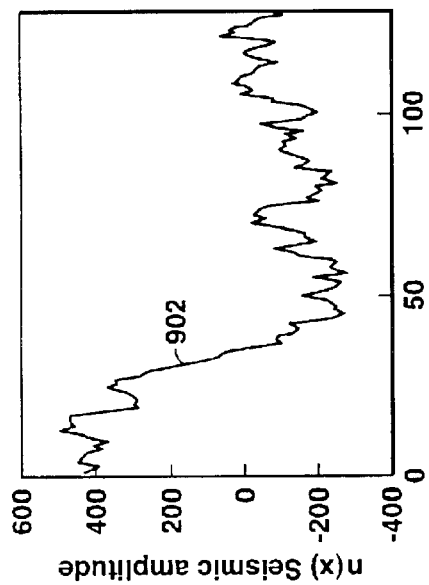
FIG. 9A is a plot of the amplitude of the recorded seismic signal f(x) versus CDP number for a model of a non-periodic spatially varying amplitude artifact.
Figure 9B:
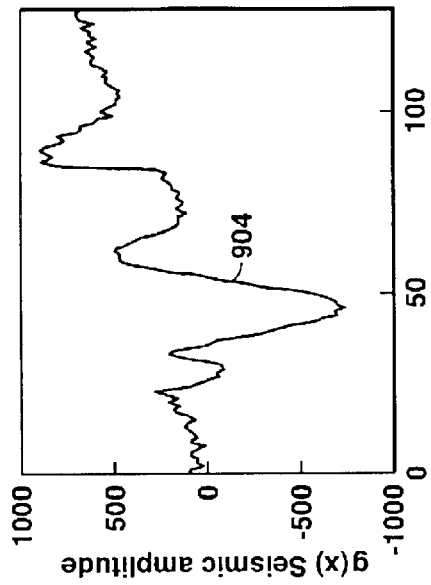
FIG. 9B is a plot of the amplitude of the acquisition artifact n(x) versus CDP number for the model of a non-periodic spatially varying amplitude artifact.
Figure 9C:
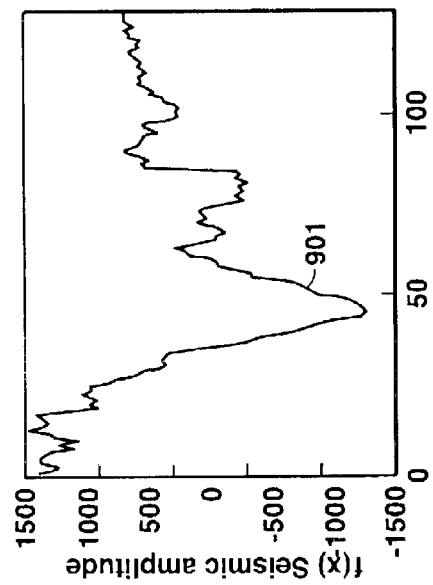
FIG. 9C is a plot of the amplitude of the artifact modulation ϵ(x) versus CDP number for the model of a non-periodic spatially varying amplitude artifact.
Figure 9D:
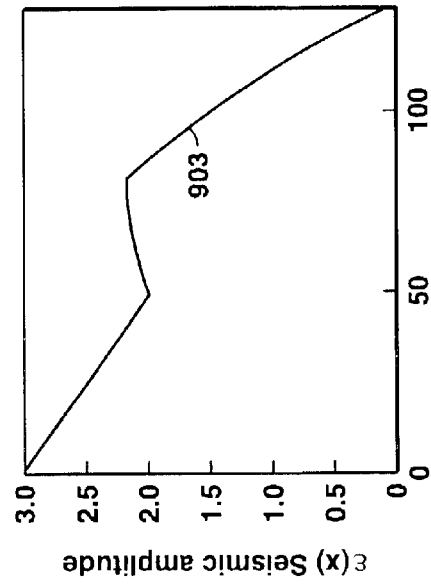
FIG. 9D is a plot of the amplitude of the target seismic signal g(x) versus CDP number for the model of a non-periodic spatially varying amplitude artifact.

The filtering method of the invention can also be used to remove non-periodic spatially varying artifacts. FIGS. 9A–9D show the elements of a model of non-periodic spatially varying artifacts. FIG. 9A is a plot of the amplitude of a recorded seismic signal f(x) 901 versus CDP number. FIG. 9B shows an acquisition artifact spatial periodicity signal n(x) 902 with known spatial character, while FIG. 9C shows the artifact amplitude modulation signal $\epsilon(x)$ 903, with both plots being amplitude versus CDP number. FIG. 9D shows the true geologic signal g(x) 904, as a plot of seismic amplitude versus CDP number. These experiments follow the model described in Equation (2).

Notice that in this example, the artifact perturbation is random. Thus, traditional Fourier techniques cannot be applied. Even the moving window average and the discrete wavelet transform low-pass filter cannot be applied here because of the arbitrariness involved in the selection of a window size or in the separation of scales between the signal and the noise.

Figure 10A:
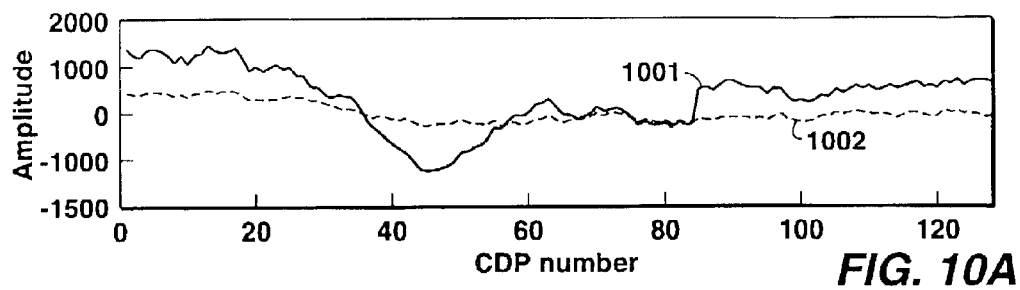
FIG. 10A is a comparison of the input signal f(x) from FIG. 8A with the spatial periodicity signal n(x) from FIG. 8B.
Figure 10B:
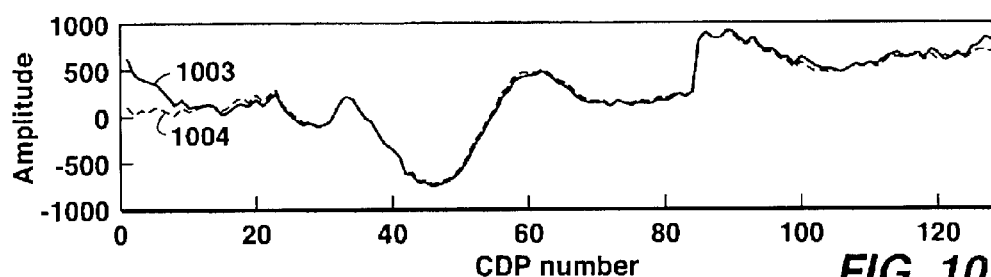
FIG. 10B is a comparison of the estimated geologic signal ĝ(x), estimated using an embodiment of the invention implemented in the discrete wavelet transform domain, with the target signal g(x) from FIG. 8D.
Figure 10C:
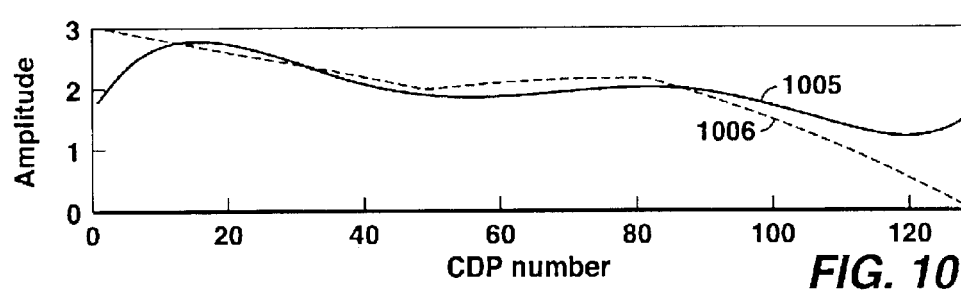
FIG. 10C is a comparison of the estimated modulation of the noise signal ε̂(x) with the actual modulation ε(x) from FIG. 8C.

FIGS. 10A–10C show the results with the filtering technique of the invention, as implemented in the wavelet domain. Aside from some edge effects, the fit is remarkably good. FIG. 10A shows a comparison of the input seismic signal f(x) 1001, from FIG. 9A, with the artifact spatial periodicity signal n(x) 1002, from FIG. 9B. FIG. 10B shows a comparison of the estimated geologic signal $\hat{g}(x)$ 1003 with the actual geologic signal g(x) 1004 from FIG. 9D. Here, the signal $\hat{g}(x)$ 1003 is estimated using the method of an embodiment of the invention as implemented in the discrete wavelet transform domain. The comparison has statistical measures of $R^2=0.964$ and RMSE=86.9. FIG. 10C shows a comparison of the estimated amplitude modulation portion of the noise signal $\hat{\epsilon}(x)$ 1005 with the actual amplitude modulation $\epsilon(x)$ 1006 from FIG. 9C. All plots are of amplitude versus CDP number.

Figure 11A:
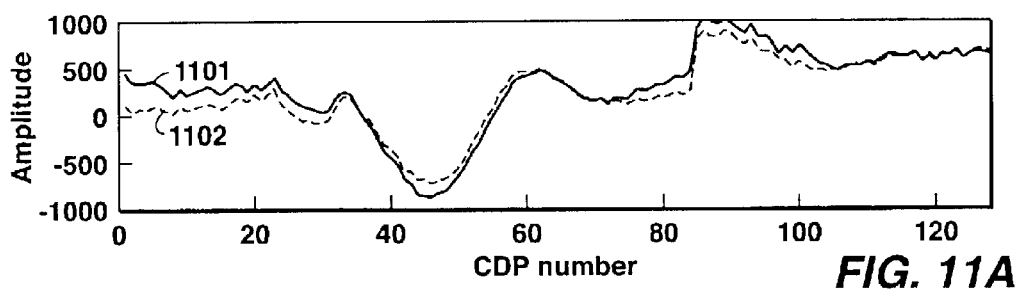
FIG. 11A is a comparison of the estimated geologic signal ĝ(x), estimated using an embodiment of the invention implemented in the fast Fourier transform domain, with the target geologic signal g(x) from FIG. 8D.
Figure 11B:
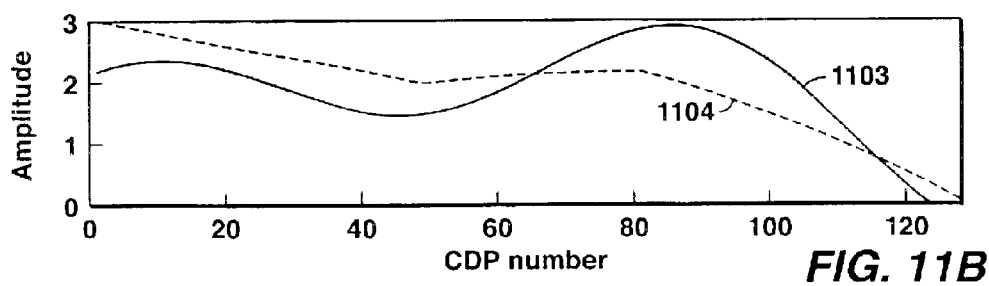
FIG. 11B is a comparison of the estimated modulation of the noise signal ε̂(x) with the actual modulation ε(x) from FIG. 8C.

FIGS. 11A–11B show the results from the application of the scaling filter of the invention as implemented in the Fourier domain. The fit is still very good, although edge effects are present. FIG. 11A shows a comparison of the estimated geologic signal $\hat{g}(x)$ 1101 with the actual geologic signal g(x) 1102, from FIG. 9D, as a plot of amplitude versus CDP number. Here, the signal $\hat{g}(x)$ 1101 is estimated using the method of an embodiment of the invention as implemented in the fast Fourier transform domain. The comparison has statistical measures of $R^2=0.940$ and RMSE=122.7. FIG. 11B shows the estimated amplitude modulation portion of the noise signal $\hat{\epsilon}(x)$ 1103 with the actual amplitude modulation $\epsilon(x)$ 1104, from FIG. 9C, as a plot of amplitude versus CDP number.

For an example of a two-dimensional problem, FIGS. 12A–12D show the case in which the artifacts are described as having a "red noise" trend. The redness implies that the noise has a long-lasting trend. This means that it has a relatively long memory, as opposed to regular white noise, in which any two neighboring samples are uncorrelated. In the example, the terminology from Equation (6) is used. FIGS. 12A–12D are black and white reproductions of colored drawings (as are FIGS. 13A–13D and 14A–14D).

In the example, with numbered references appearing on FIG. 12B, sinuous channels 1201, reefal structures 1202, and a major fault 1203 are drawn to simulate realistically some of the geological patterns that would be expected using seismic data (namely time slices, horizon amplitude maps or seismic attribute maps). In addition, a few rectangular 1204 and circular 1205 objects are drawn to help estimate the impact of the scaling filtering technique on spatial resolution and edge detection.

FIG. 12A shows a map view of the recorded signal f(x,y) which includes artifacts. FIG. 12B shows a map view of the geologic signal, the target image, g(x,y), with no artifacts. Note that the geological features such as the reefal structures and sinuous channels that are clear in the target image of FIG. 12B are nearly undistinguishable to the eye in FIG. 12A as a result of the presence of the artifacts. FIG. 12C shows a map view of the noise spatial periodicity signal, n(x,y), while FIG. 12D shows a map view of the amplitude modulation signal $\epsilon(x,y)$ applied to the noise signal in FIG. 12C.

Figure 13A:
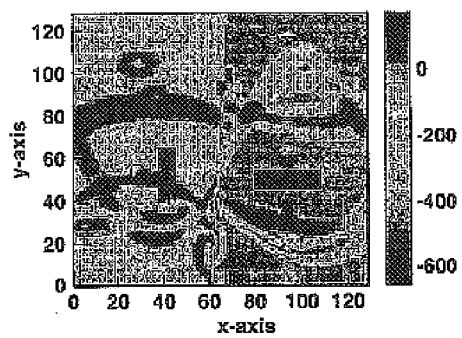
FIG. 13A is a map view of the estimated geologic signal, ĝ(x), obtained using an embodiment of the invention implemented in the discrete wavelet transform domain.
Figure 13B:
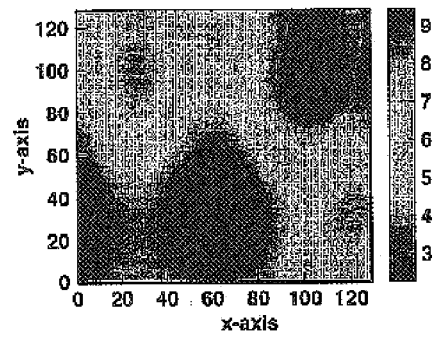
FIG. 13B is a map view of the estimated modulation ε̂(x,y), obtained using an embodiment of the invention implemented in the discrete wavelet transform domain.
Figure 13C:
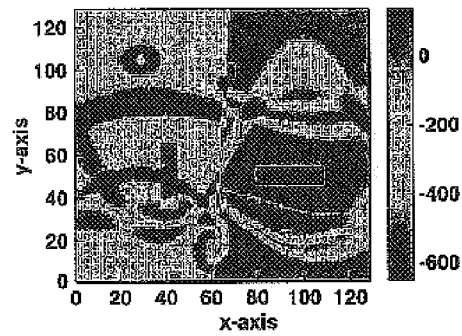
FIG. 13C is a map view of the target geologic signal g(x,y) from FIG. 12B.
Figure 13D:
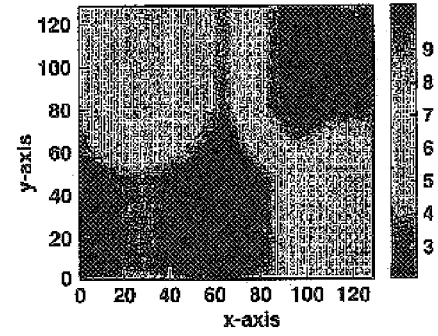
FIG. 13D is a map view of the actual modulation function ε(x,y) from FIG. 12D.

The results of the application of the two-dimensional version of the scaling filter are shown in FIGS. 13A–13D. FIG. 13A shows a map view of the estimated geologic signal, $\hat{g}(x,y)$, obtained using the method of an embodiment of the invention, as implemented in the discrete wavelet transform domain. FIG. 13B shows a map view of the estimate of the amplitude modulation signal $\hat{\epsilon}(x,y)$ obtained using the method of an embodiment of the invention, as implemented in the discrete wavelet transform domain. FIG. 13C shows a map view of the actual geologic signal, g(x,y), with no artifacts, reproduced from FIG. 12B. FIG. 13D shows a map view of the actual amplitude modulation signal $\epsilon(x,y)$, reproduced from FIG. 12D.

The initial poor fit is captured by the statistical measures between the recorded seismic signal f(x,y) in FIG. 12A and the perturbation noise spatial periodicity signal n(x,y) in FIG. 12C of $R^2=0.160$ and RMSE=664.886. A dramatic reduction in artifacts is provided by this embodiment of the invention implemented in the wavelet domain, as indicated by a visual comparison of the estimated signal in FIG. 13A and the actual signal in FIG. 13C. The fit is extremely good and spatial resolution is remarkably well maintained. The target image is recovered very well, with only some edge effects visible. Quantitative measures of the fit have values of $R^2=0.97$ and RMSE=43.98 between the estimated geologic signal $\hat{g}(x,y)$ in FIG. 13A and the target geologic signal g(x,y) in FIG. 13C. The modulation function is also recovered quite well, as indicated by a visual comparison of the estimated function in FIG. 13B and the actual function in FIG. 13D, in spite of the sharp (discontinuous) variations inserted for the purposes of the test. Quantitative values of $R^2=0.972$ and RMSE=0.370 are calculated between the estimated amplitude modulation signal $\hat{\epsilon}(x,y)$ in FIG. 13B and the actual amplitude modulation signal $\epsilon(x,y)$ in FIG. 13D. Overall, the (noisy) input map is cleaned up considerably. Many of the original sharp edges of the various objects are retained remarkably well.

The results presented here are typical for the application of the present invention to synthetic images. Similar results have been obtained where the perturbation is not simply additive to the target image.

Finally, in FIGS. 14A–14D, the application of the method of the invention to an actual marine data set is shown. The method was applied to amplitude attribute maps. The data set was chosen because of the apparent effect of a shallow channel system (gas prone) on a deeper target (oil prone).

Figure 14A:
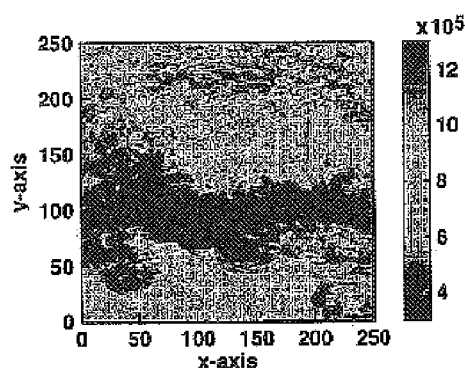
FIG. 14A is a map view of a recorded amplitude attribute signal f(x,y) for a seismic marine data set.
Figure 14B:
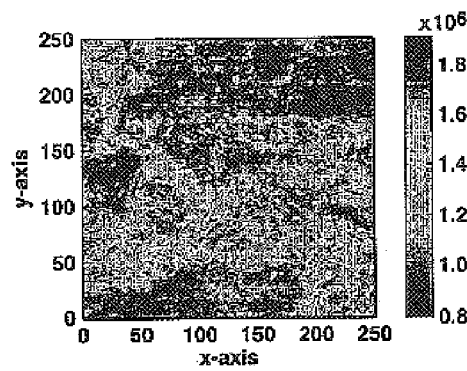
FIG. 14b is a map view of the perturbation signal n(x,y) for the seismic marine data set.
Figure 14C:
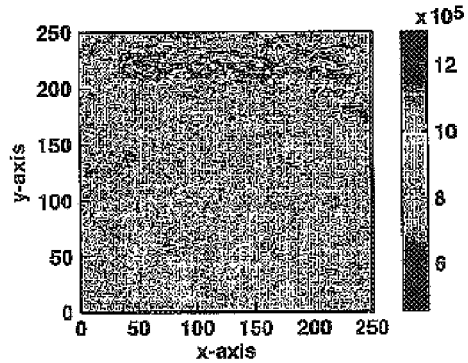
FIG. 14C is a map view of the estimated geologic signal, ĝ(x,y), for the seismic marine data set.
Figure 14D:
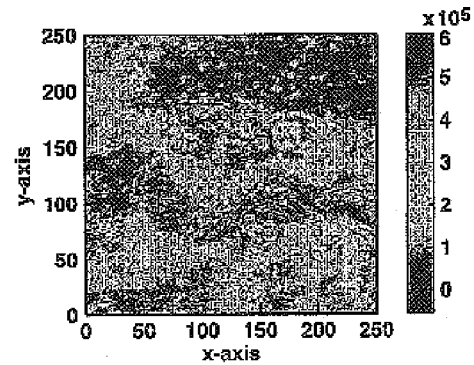
FIG. 14D is a map view of the difference between the estimated and recorded attribute signals, ĝ(x,y), −f(x,y), for the seismic marine data set.

FIG. 14A shows a map view of an amplitude attribute from an interval roughly between 1.5 and 2 sec. This is the perturbed attribute map f(x,y). FIG. 14B shows a map view of an amplitude attribute map from a shallower interval, between the water bottom and 1.5 sec. This is the actual localized perturbation signal n(x,y). FIG. 14C shows a map view of the recovered amplitude attribute map, ĝ(x,y). FIG. 14D shows a map view of the difference ĝ(x,y)–f(x,y) between the estimated and the recorded attribute maps.

The effect of the shallow channel complex is obvious as amplitude dimming. The correlation between the attribute signal f(x,y) in FIG. 14A and the perturbation signal n(x,y) in FIG. 14B is R=−0.667, which is highly significant for 65,536 data points. From simple geological considerations, such as considering the ages of the rocks comprised between the two seismic time intervals, it can be assumed that such negative correlation is spurious and geologically unsupportable. After the discrete wavelet transform scaling filtering, the correlation between the recovered attribute signal ĝ(x,y) in FIG. 14C and the perturbation signal n(x,y) in FIG. 14B is R=0.087, which is negligible from a geologic standpoint, and is indicative of the fact that the analysis procedure of the present invention thus removed the footprint of the shallower perturbation as desired. This is clearly visible on the attribute map, FIG. 14C, in which the high amplitudes outside the shallow channel complex have not been affected, in other words in those areas near the upper portion of the Y-axis. Only the area affected by the channel has undergone a significant amplitude boost, in other words in the areas roughly ranging along the Y-axis from 50 to 150. The correlation between the difference map ĝ(x,y)–f(x,y) in FIG. 14D and the perturbation signal n(x,y) in FIG. 14B is R=0.944, thus reinforcing the conclusion resulting from a visual comparison of FIGS. 14B and 14D that the method removed surgically only the artifact perturbation. No other method is known which is capable of achieving such results. For example, seismic AGC, even for a short window, does not remove such correlation as postulated by the method of the invention and has the net effect of distorting the seismic amplitudes outside the area of interest.

Several other experiments have been performed, using both synthetic images and actual images of time slices or attribute maps from actual seismic data. The results presented here are typical of those obtained under controlled conditions. When using actual data, numerical tests indicate that spatial resolution is preserved while the acquisition or perturbation footprint is still removed. No other method is known which can yield such good results for extremely localized and nonperiodic perturbations. The present method appears to give a significant technical advantage that is not matched by any currently known post-stack seismic processing algorithm.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

We claim:

1. A method for estimating noise in a seismic signal, comprising the steps of:

representing the seismic signal as a combination of a geologic signal and a noise signal;

decomposing the representation of the seismic signal into a linear combination of orthonormal components;

identifying one or more of the orthonormal components in which the geologic signal and the noise signal are substantially uncorrelated;

expanding the noise signal as a product of an unknown amplitude modulation signal and a known spatial periodicity signal at the identified components;

estimating the amplitude modulation signal at the identified components; and multiplying the estimated amplitude modulation signal by the spatial periodicity signal to generate an estimated noise signal.

2. The method of claim 1, comprising the further step of:

removing the estimated noise signal from the seismic signal to generate an estimated geologic signal.

3. The method of claim 1, wherein the combination representing the seismic signal is a sum.

4. The method of claim 1, wherein the combination representing the seismic signal is a product.

5. The method of claim 1, wherein the step of decomposing the representation of the seismic signal comprises mathematical wavelet decomposition.

6. The method of claim 5, wherein the identified linear combination components are periodicity levels.

7. The method of claim 1, wherein the step of decomposing the representation of the seismic signal comprises Fourier spectral decomposition.

8. The method of claim 7, wherein the identified linear combination components are frequency bands.

9. The method of claim 1, wherein the step of expanding the noise signal comprises the further step of:

expanding the amplitude modulation signal in a series of substantially orthonormal basis functions.

10. A method for estimating noise in a seismic signal, comprising the steps of:

representing the seismic signal as a combination of a geologic signal and a noise signal;

separating the seismic signal into a plurality of frequency bands; and for each band,
decomposing the representation of the seismic signal into a linear combination of orthonormal components;

identifying one or more of the orthonormal components in which the geologic signal and the noise signal are substantially uncorrelated;

expanding the noise signal as a product of an unknown amplitude modulation signal and a known spatial periodicity signal at the identified components;

estimating the amplitude modulation signal at the identified components; and multiplying the estimated amplitude modulation signal by the spatial periodicity signal to generate an estimated noise signal for the band, and adding the estimated noise signals from each of the frequency bands to generate a total estimated noise signal.

11. The method of claim 10, comprising the further step of:

removing the total estimated noise signal from the seismic signal to generate an estimated geologic signal.

12. A method for estimating noise in a seismic signal, wherein the seismic signal comprises a three-dimensional volume, comprising the steps of:

representing the seismic signal as a combination of a geologic signal and a noise signal;

separating the seismic signal into a plurality of vertical intervals; and for each interval, decomposing the representation of the seismic signal into a linear combination of orthonormal components;

identifying one or more of the orthonormal components in which the geologic signal and the noise signal are substantially uncorrelated;

expanding the noise signal as a product of an unknown amplitude modulation signal and a known spatial periodicity signal at the identified components;

estimating the amplitude modulation signal at the identified components; and multiplying the estimated amplitude modulation signal by the spatial periodicity signal to generate an estimated noise signal for the interval.

13. The method of claim 12, comprising the further steps of:

determining an amplitude scaling factor for substantially mitigating the effects of the estimated noise signal within each vertical interval;

combining the amplitude scaling factors from the vertical intervals to generate a volumetric amplitude scaling factor; and multiplying the volumetric amplitude scaling factor by the seismic signal to generate a volumetric estimated geologic signal.

* * * * *